US007460134B2

(12) United States Patent
Robertson et al.

(10) Patent No.: US 7,460,134 B2
(45) Date of Patent: Dec. 2, 2008

(54) SYSTEM AND METHOD FOR MOVING COMPUTER DISPLAYABLE CONTENT INTO A PREFERRED USER INTERACTIVE FOCUS AREA

(75) Inventors: George G Robertson, Seattle, WA (US); Patrick Markus Baudisch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 468 days.

(21) Appl. No.: 10/952,522

(22) Filed: Sep. 28, 2004

(65) Prior Publication Data

US 2005/0195217 A1     Sep. 8, 2005

Related U.S. Application Data

(60) Provisional application No. 60/549,481, filed on Mar. 2, 2004.

(51) Int. Cl.
*G09G 5/30*     (2006.01)
(52) U.S. Cl. ............... 345/619; 345/660; 715/700
(58) Field of Classification Search ......... 345/619, 345/660; 715/700
See application file for complete search history.

(56) References Cited

U.S. PATENT DOCUMENTS

| | | | | |
|---|---|---|---|---|
| 5,699,244 | A * | 12/1997 | Clark et al. .............. | 702/2 |
| 5,956,000 | A * | 9/1999 | Kreitman et al. ......... | 345/1.3 |
| 6,166,736 | A * | 12/2000 | Hugh ..................... | 715/798 |
| 6,760,048 | B1 * | 7/2004 | Bates et al. ............. | 715/797 |
| 6,938,101 | B2 * | 8/2005 | Hayes et al. ............ | 710/5 |
| 7,216,177 | B1 * | 5/2007 | Strong et al. ............ | 709/230 |
| 2002/0112237 | A1 * | 8/2002 | Kelts ..................... | 725/39 |
| 2002/0143890 | A1 * | 10/2002 | Naqvi .................... | 709/217 |
| 2003/0115288 | A1 * | 6/2003 | Ljubicich et al. ........ | 709/219 |

(Continued)

FOREIGN PATENT DOCUMENTS

JP     0967797 A2 * 12/1999

OTHER PUBLICATIONS

Synchronous gestures for multiple persons and computers Ken Hinckley Nov. 2003 Proceedings of the 16th annual ACM symposium on User interface software and technology UIST '03 Publisher: ACM Press.*

(Continued)

*Primary Examiner*—Kee M. Tung
*Assistant Examiner*—J. Amini
(74) *Attorney, Agent, or Firm*—Christensen O'Connor Johnson Kindness PLLC (57) ABSTRACT

According to the present invention, a system for displaying content, such as a computer's displayed desktop, to a user such that remote content may be easily accessed, is presented. An exemplary display system includes a preferred interaction area through which the user interacts with the displayed content. The display system detects a user's reposition action and repositions the displayed content on the display system according to the detected reposition action. A user may reposition any portion of the displayed content to any location within the preferred interaction area. That portion of the displayed content falling outside of the preferred interaction area is displayed according to the available display area outside of the preferred interaction area. The displayed content outside of the preferred interaction area may be scaled according to the available display area. Display areas uncovered by repositioning the displayed content may be displayed with empty space.

20 Claims, 10 Drawing Sheets

U.S. PATENT DOCUMENTS

| | | | |
|---|---|---|---|
| 2004/0127193 A1* | 7/2004 | Timmins et al. | 455/405 |
| 2005/0125488 A1* | 6/2005 | Kulkarni et al. | 709/201 |
| 2005/0131992 A1* | 6/2005 | Goldstein et al. | 709/202 |
| 2005/0168488 A1* | 8/2005 | Montague | 345/659 |
| 2005/0273727 A1* | 12/2005 | Barbanson et al. | 715/791 |
| 2006/0069808 A1* | 3/2006 | Mitchell et al. | 709/246 |
| 2007/0109277 A1* | 5/2007 | Lira | 345/173 |
| 2007/0132886 A1* | 6/2007 | Jang | 348/555 |
| 2007/0198914 A1* | 8/2007 | Chiang | 715/513 |

OTHER PUBLICATIONS

Dynamo: a public interactive surface supporting the cooperative sharing and exchange of media Shahram Izadi, Harry Brignull, Tom Rodden, Yvonne Rogers, Mia Underwood Nov. 2003 Proceedings of the 16th annual ACM symposium on User interface software and technology UIST '03 Publisher: ACM Press.* iMobile EE: an enterprise mobile service platform Yih-Farn Chen, Huale Huang, Rittwik Jana, Trevor Jim, Matti Hiltunen, Sam John, Serban Jora, Radhakrishnan Muthumanickam, Bin Wei Jul. 2003 Wireless Networks, vol. 9 Issue 4 Publisher: Kluwer Academic Publishers.*

Interaction techniques for handheld devices: Peephole displays: pen interaction on spatially aware handheld computers Ka-Ping Yee Apr. 2003 Proceedings of the SIGCHI conference on Human factors in computing systems CHI '03 Publisher: ACM Press.*

Baudisch, P., et al., "Drag-and-Pop and Drag-and-Pick: Techniques for Accessing Remote Screen Content on Touch- and Pen-Operated Systems," Proceedings of the 9th IFIP TC13 International Conference on Human-Computer Interaction (Interact 2003), Zurich, Switzerland, Sep. 1-5, 2003, pp. 57-64.

Beaudouin-Lafon, M., "Instrumental Interaction: An Interaction Model for Designing Post-WIMP User Interfaces," CHI 2000 (2)1:446-453, Apr. 1-6, 2000.

Bier, E., et al., "Toolglass and Magic Lenses: The See-Through Interface," Proceedings of the 20th Annual Conference on Computer Graphics and Interactive Techniques (SIGGRAPH 93), Anaheim, Calif., Aug. 2-6, 1993, pp. 73-80.

Dietz, P.H., and D. Leigh, "DiamondTouch: A Multi-User Touch Technology," CHI Letters (3)2:219-226, Nov. 11-14, 2001.

Elrod, S., et al., "Liveboard: A Large Interactive Display Supporting Group Meetings, Presentations and Remote Collaboration," Proceedings of the ACM Conference on Human Factors in Computing Systems (CHI 1992), Monterey, Calif., May 3-7, 1992, pp. 599-607.

Guiard, Y., et al., "Beyond the 10-Bit Barrier: Fitts' Law in Multi Scale Electronic Worlds," Proceedings of Joint AFIHM-BCS Conference on Human-Computer Interaction (IHM-HCI 2001), Lille, France, Sep. 10-14, 2001, pp. 573-587.

Guimbretière, F., et al., "Fluid Interaction With High Resolution Wall Size Displays," Proceedings of the 14th Annual ACM Symposium on User Interface Software and Technology (UIST 2001), Orlando, Fla., Nov. 11-14, 2001, pp. 21-30.

Igarashi, T., and K. Hinckley, "Speed-Dependent Automatic Zooming for Browsing Large Documents," CHI Letters 2(2):139-148, Nov. 2000.

Johanson, B., et al., "PointRight: Experience With Flexible Input Redirection in Interactive Workspaces," Proceedings of the 15th Annual ACM Symposium on User Interface Software and Technology (UIST 2002), Paris, France, Oct. 27-30, 2002, pp. 227-234.

Matsushita, N., et al., "Dual Touch: A Two-Handed Interface for Pen-Based PDAs," CHI Letters 2(2):211-212, Nov. 2000.

Myers, B.A., et al., "Interacting at a Distance: Measuring the Performance of Laser Pointers and Other Devices," CHI Letters 4(1):33-40, Apr. 2002.

Pier, K., and J.A. Landay, "Issues for Location-Independent Interfaces," Technical Report ISTL92-4, Xerox Palo Alto Research Center, Dec. 1992.

Rekimoto, J., "Pick and Drop: A Direct Manipulation Technique for Multiple Computer Environments," Proceedings of the 10th Annual ACM Symposium on User Interface Software and Technology (UIST 1997), Banff, Canada, Oct. 14-17, 1997, pp. 31-39.

Rekimoto, J., "Tilting Operations for Small Screen Interfaces," Proceedings of the 9th Annual ACM Symposium on User Interface Software and Technology (UIST 1996), Seattle, Wash., Nov. 6-8, 1996, pp. 167-168.

Rekimoto, J., and M. Saitoh, "Augmented Surfaces: A Spatially Continuous Work Space for Hybrid Computing Environments," Proceedings of the ACM's Special Interest Group on Computer-Human Interaction, Conference on Human Factors in Computing Systems (CHI 1999), Pittsburgh, Pa., May 15-20, 1999, pp. 378-385.

Robertson, G., and S. Card, "Fix and Float: Object Movement by Egocentric Navigation," Proceedings of the 10th Annual ACM Symposium on User Interface Software and Technology (UIST 1997), Banff, Canada, Oct. 14-17, 1997, pp. 149-150.

Robertson, G., et al., "The Large-Display User Experience," IEEE Computer Graphics and Applications, Jul./Aug. 2005, pp. 2-9.

Streitz, N.A., et al., "Roomware: Toward the Next Generation of Human Computer Interaction Based on an Integrated Design of Real and Virtual Worlds," J.A. Carroll (ed.), Human-Computer Interaction in the New Millennium, Addison-Wesley, 2002, pp. 553-578.

Yee, K.-P., "Peephole Displays: Pen Interaction on Spatially Aware Handheld Computers," Proceedings of the ACM's Special Interest Group on Computer-Human Interaction, Conference on Human Factors in Computing Systems (CHI 2003), Ft. Lauderdale, Fla., Apr. 5-10, 2003, pp. 1-8.

* cited by examiner

SYSTEM AND METHOD FOR MOVING COMPUTER DISPLAYABLE CONTENT INTO A PREFERRED USER INTERACTIVE FOCUS AREA

CROSS-REFERENCE TO RELATED APPLICATION(S)

This application claims the benefit of U.S. Provisional Application No. 60/549,481, filed Mar. 21, 2004.

FIELD OF THE INVENTION

The present invention relates to computers and computer displays, and, more particularly, to a system and method for moving computer display content into a preferred interactive focus area.

BACKGROUND OF THE INVENTION

Over the past few years, numerous types of display systems, attached to computers and computing systems, have become increasingly more available and commonplace, such as wall-sized display systems, pen- and touch-operated display systems, multi-monitor display systems, and the like. On such display systems, users often encounter difficulties when accessing certain displayed content (called target acquisition), especially when the desired content is relatively remote from the user's current position or reach, or displayed on a display unit that is not interactive. For example, on wall-size display systems, a user may need to walk, or even climb a ladder, in order to access certain content displayed in a remote location. As another example, a tablet computer with a touch sensitive screen, with which a user interacts via a conforming pen or stylus, is often connected to a second display monitor, such as a CRT monitor, that is not touch sensitive. If the user wishes to switch from working on content currently displayed on the tablet computer to working on content displayed on the second display monitor, i.e., the CRT monitor, the user must switch user-interaction paradigms by switching from a stylus to a mouse, locating the mouse's corresponding cursor, moving the cursor to the target content, and interacting with the content of the second display monitor now using the mouse.

As those skilled in the art will appreciate, rather than having large display areas, computer systems, and their corresponding software, have historically focused on displaying content that is larger than the display area. For instance, large documents, pictures, and spreadsheets are displayed in windows/views, where only a portion of the content is visible. To make other portions visible, the window/view typically includes a scrolling mechanism, such as scroll bars, for moving portions of the content into the window/view. Unfortunately, only a portion of the content is ever visible. Furthermore, the content is only scrolled so far as the extent of the content becomes visible. A computer's desktop, i.e., the entire displayed content of the computer system, may also be larger than the displayable surface, especially for notebook and tablet computers, or for personal digital assistants (PDAs.) When the desktop is larger than the displayable surface, the computer system provides for scrolling the undisplayed portions into the displayable surface, typically by trying to move the cursor beyond the edge of the displayable surface. However, just as with a large documents and pictures, the desktop stops scrolling when the furthest extent of the desktop is scrolled/displayed on the displayable surface.

Unfortunately, as mentioned above, content visibility does not imply easy accessibility, especially in regard to display systems such as the wall-sized units, or multi-unit display systems that use disparate input mechanisms per display unit. In light of these and other issues found in the prior art, what is needed is a system and method for facilitating the access of remotely displayed content. The present invention addresses these and other issues found in the prior art.

SUMMARY OF THE INVENTION

In accordance with aspects of the present invention, a method for relocating desktop content on a display system, implemented on a computer system including a display system with a defined preferred interaction area, is presented. A reposition action is detected. The reposition action indicates that the desktop content is to be repositioned with respect to the preferred interaction area. The desktop content is repositioned according to the detected reposition action, such that a portion of the desktop content previously outside of the preferred interaction area is now located within the preferred interaction area. The desktop content falling outside of the preferred interaction area is displayed according to the available display area outside of the preferred interaction area.

In accordance with further aspects of the present invention, a computer-readable medium bearing computer-executable instructions is presented. When executed on a computer system including a display system with a defined preferred interaction area, the computer-executable instructions carry out a method for relocating desktop content on the display system. A reposition action is detected. The reposition action indicates that the desktop content is to be repositioned with respect to the preferred interaction area. The desktop content is repositioned according to the detected reposition action, such that a portion of the desktop content previously outside of the preferred interaction area is now located within the preferred interaction area. The desktop content falling outside of the preferred interaction area is displayed according to the available display area outside of the preferred interaction area.

In accordance with yet further aspects of the present invention, a computer system for displaying desktop content to a user is presented. The computer system comprises a user interaction means. The user interaction means detects repositioning actions from a user, permitting the user to control the repositioning of the desktop content displayed on a display system. The computer system further comprises a display system for displaying the desktop content. The display system includes a preferred interaction action area within which the user interacts with the desktop content via the user interaction means. The computer system, upon detected a repositioning action from a user, repositions the desktop content according to the detected repositioning action. The desktop content is repositioned such that a portion of the desktop content previously outside of the preferred interaction area is now located within the preferred interaction area. The desktop content falling outside of the preferred interaction area is displayed according to the available display area outside of the preferred interaction area.

In accordance with still further aspects of the present invention, a display system for displaying content to a user is presented. The display system includes a preferred interaction area and a user interaction means. The preferred interaction area is a subset of the display area of the display system. A user interacts with the display system to reposition the content through the preferred interaction area. A user interacts with the display system in the preferred interaction area via the user interaction means. When the display system detects a repositioning action from a user, the content within the display system is repositioned accorded to the detected repositioning action, such that a portion of the displayed content previously outside of the preferred interaction area is now located within the preferred interaction area. The content falling outside of the preferred interaction area is displayed according to the available display area for displaying content outside of the preferred interaction area.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
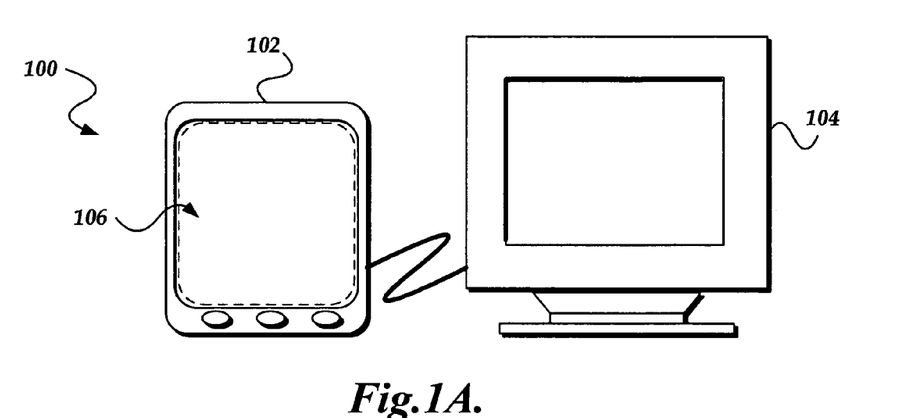
FIGS. 1A and 1B are pictorial diagrams illustrating exemplary display system environments suitable for implementing aspects of the present invention.
Figure 1B:
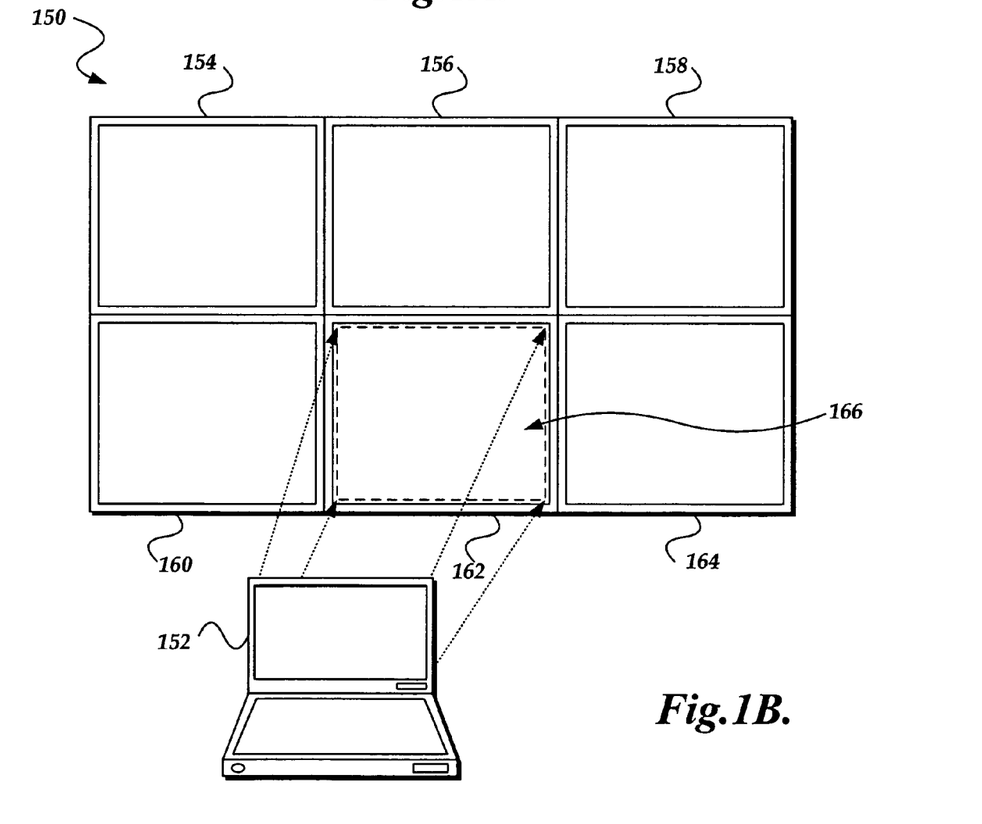

According to aspects of the present invention, a display system adapted according to the present invention includes a preferred interaction area. The preferred interaction area is that portion of the display system through which the user interacts with the displayable content, such as a computer desktop or document. Preferably, the preferred interaction area is conveniently located and accessible to the user. FIGS. 1A and 1B are pictorial diagrams illustrating exemplary display systems suitable for implementing aspects of the present invention, each including a preferred interaction area.

With regard to FIG. 1A, the exemplary display system 100 includes a tablet computer 102 and an external monitor 104. For this example, the preferred interaction area 106 of the display system 100 corresponds to the input/display area of the tablet computer 102.

With regard to FIG. 1B, the exemplary display system 150 includes a notebook computer 152 connected to a multi-monitor wall display unit that includes monitors 154-164. In this exemplary system 150, the preferred interaction area 166 corresponds to the display area of the notebook computer 152. Thus, as can be seen in this example, the preferred interaction area 166 is duplicated, found on both the notebook computer 152 and on monitor 162.

As illustrated in FIGS. 1A and 1B, the preferred interaction area is frequently, but not always, substantially smaller than the entire display surface of the display system. Thus, according to aspects of the present invention, when a user wishes to interact with content not currently located within the preferred interaction area (in other words, remote content) the user causes the displayed content to reposition (scroll) until the remote content is located within the preferred interaction area.

According to aspects of the present invention, displayable content, such as the computer desktop, may be positioned with respect to the preferred interaction area using a variety of user interactions, including, but not limited to, mouse/pointer movements or panning, key presses, and activating related scroll bars, as well as numerous combinations thereof. Panning refers to the combination of pressing or "clicking" a selection button on a user interaction device, such as a mouse and, while maintaining the selection, moving the mouse (or other interaction device) to scroll or reposition the displayable content in the display area. Additionally, as will be described below, user interactions may be associated with incremental or absolute repositioning of the displayable content.

In regard to incremental movement, according to aspects of the present invention, during repositioning, the displayable content may be moved in predetermined amounts. These amounts range from single pixels up to any suitable/desirable size. Repositioning the displayable content in smaller increments may provide a smoother, or continuous, scrolling affect. According to further aspects, the amount of incremental movement may be scaled with regard to the user's action. For example, a movement of 1 pixel in a cursor drag operation may correspond to moving the displayable content 10 pixels. Scaling the movement of the displayable content with respect to the user's interaction may assist a user to more quickly access remotely displayed content.

According to aspects of incremental scrolling, the displayable content may be divided into regions, such as regions corresponding to the size of the preferred interaction area. For example, with reference to FIG. 1B, the displayable content may be divided into six regions, each corresponding to the size of a display monitor. Thus, by invoking the predetermined reposition action, such as pressing a user-defined function key or combination of keys, the displayable content is moved by regions, such that an adjacent region is scrolled into and displayed in the preferred interaction area.

As to absolute repositioning, targets identifying specific locations in the displayable content may be defined, and the invocation of a particular action or shortcut causes the corresponding target to be repositioned within the preferred interaction area. For example, in one embodiment, a user may right click on the desktop, thereby bringing up a context menu that contains an item for relocating regions of the screen. Activating that item brings up a small, grid representation of the entire screen and permitting the user to select an region of the screen. Selection of that region then causes the desktop to be repositioned such that the selected portion of the screen resides within the preferred interaction area 166.

It should be understood, however, that there are numerous user interaction means for directing the repositioning of the screen, and the above example should be viewed as illustrative, and not construed as limiting upon the present invention. Additionally, it should be further appreciated that in any given embodiment, both absolute and incremental repositioning may be available and desirable.

While the above examples have implicitly described the preferred interaction area 166 as remaining in the same location with respect to the display surface, according to one embodiment, the location of the preferred interaction area 166 with respect to the display surface is user configurable. For example, with regard to the above example of right clicking to bring up a context menu for repositioning the displayable content, the mouse coordinates at the time of the right click could be utilized to specify the preferred interaction area. Thus, by selecting a region from the grid, the preferred interaction area could be selectively repositioned on the display device, as well as relocating that selected portion of the display area into the newly relocated preferred interaction area. Alternatively, in various embodiments of the present invention, the displayable content or the preferred interaction area may be relocated separately. Accordingly, it should be appreciated that the preferred interaction area should not be construed as constrained to any particular region, nor should the present invention be construed as maintaining the preferred interaction area 166 fixed in a particular location on the display device.

One aspect associated with repositioning displayable content on the display system, especially when the size of the displayable content corresponds to the displayable surface area of the display system, is that the displayable content may be scrolled/repositioned without limiting its movement to the extents of the display surface. In other words, in most window/view paradigms, objects located at the extent of the displayable content can be scrolled only until they become visible within the window in which they are displayed. Similarly, a computer desktop, whose size is larger than the displayable area of the display device upon which it is displayed, can scroll or pan only until the furthest extent of the desktop becomes visible. In contrast, according to aspects of the present invention, a user may reposition any portion of the displayable content into the preferred interaction area, irrespective of the extents of the displayable content and display surface/area.

To accommodate the ability to reposition displayable content within the preferred interaction area, in one embodiment, empty space is created/displayed in the void between the maximum extent of the displayable content and the boundaries of the display system. This aspect of the present invention is illustrated below in regard to FIGS. 2, 3, and 4.

FIGS. 2, 3, 4, and 5 are pictorial diagrams illustrating an exemplary display system 200, adapted according to the present invention, for filling the area between the extent of the display content and the extent of the display system with empty space. While the exemplary display system 200 is illustrated as a single entity, it is for illustration purposes only, and should not be construed as limiting upon the present invention. For example, the display system 200 may be a single, wall sized display unit or, alternatively, the display system could be a multi-monitor display system, such as the multi-monitor display system 150 illustrated in FIG. 1B.

Figure 2:
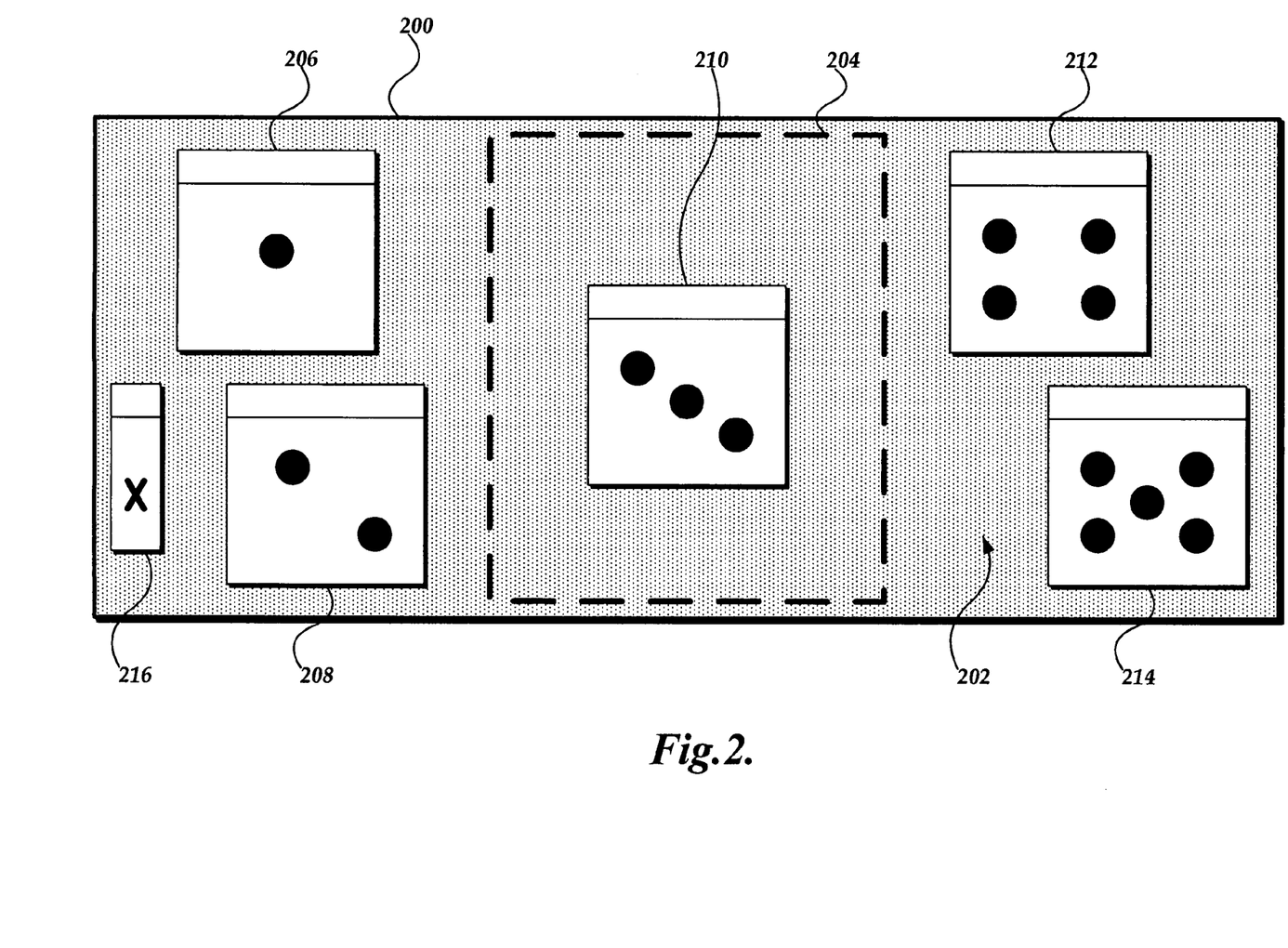
FIG. 2 is a pictorial diagram illustrating an exemplary display content on a display system according to aspects of the present invention.

As shown in FIG. 2, the displayable content 202, including icons 206-216, fills the entirety of the display system 200, with a portion of the content, specifically icon 210, falling within the preferred interaction area 204. It should be noted that while the preferred interaction area 204 is indicated with dashed lines, it is for illustration purposes only. In an actual embodiment, the preferred interaction area 204 may or may not be delineated by visible boundary lines.

Figure 3:
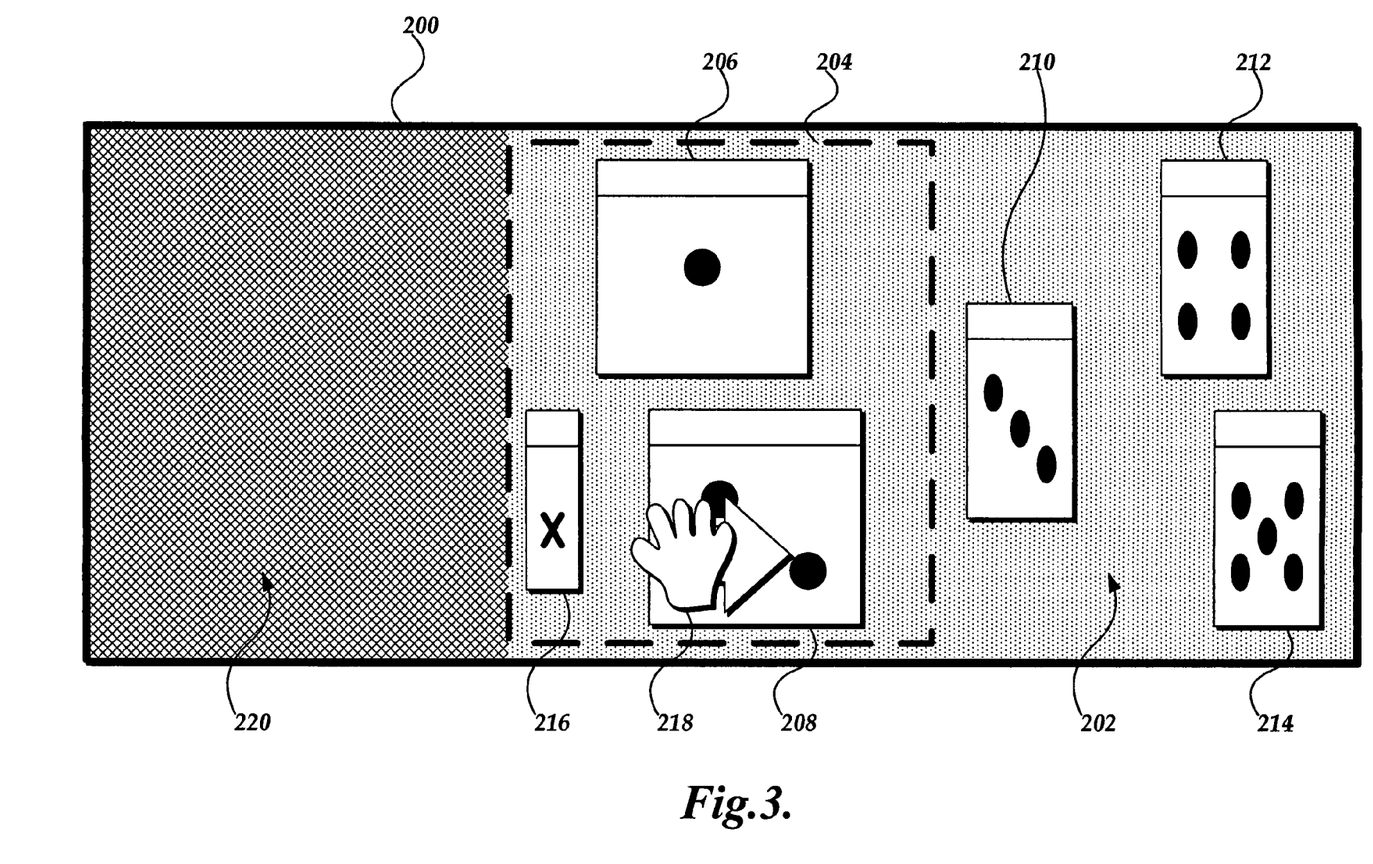
FIG. 3 is a pictorial diagram illustrating the display system and sample display content of FIG. 1 after the sample display content has been scrolled/relocated to the right in accordance with the present invention.

FIG. 3 also illustrates the display system 200 shown in FIG. 2, but after a user has repositioned the displayable content 202 within the display system. In particular, that area of the displayable content 202 that resided to the left of the preferred interaction area 204 in FIG. 2 is repositioned such that it is now relocated (in FIG. 3) into the preferred interaction area. Additionally, as shown in FIG. 3, the space 220 between the extent of the displayable content 202 and the extent of display system 200 is filled, or backfilled, with empty space.

As information is repositioned within the display system, quite frequently more displayable content will fall to one side of the preferred interaction area than can fit in a normal display mode. Thus, according to one embodiment of the present invention, when there is more displayable content to a side of the preferred interaction area than can be displayed in its normal scale, that portion of the displayable content is compressed, or scaled, such that it can be displayed in the available space on that side of the preferred interaction area. With regard to FIGS. 2 and 3, the portion of the displayable content 202 that is "pushed" to the right of the preferred interaction area cannot be displayed in a normal scale in the available display area. Consequently, that portion of the displayable content 202, including icons 210, 212, and 214 have been scaled down from their original size to fit within the available display area.

One of the benefits of backfilling with empty space, and scaling displayable content falling outside of the preferred interaction area 204, is that the displayable content, even if inaccessible, i.e., falling outside of the preferred interaction area, is still visible and provides the user with important contextual information, especially for that portion of the displayable content outside of the preferred interaction area. Additionally, when scaling the displayable content 202, the spatial arrangement of the items in the displayable content are, at least partially, preserved.

Also shown in FIG. 3 is a movement icon 218. The movement icon 218 represents a visual indication that the displayable content 202 is being repositioned. However, in at least one embodiment, a movement icon 218 is not displayed as the displayable content 202 is repositioned. Thus, the presence of the movement icon 218, as well as the shape thereof, should be viewed as illustrative only, and not construed as limiting upon the present invention.

Figure 4:
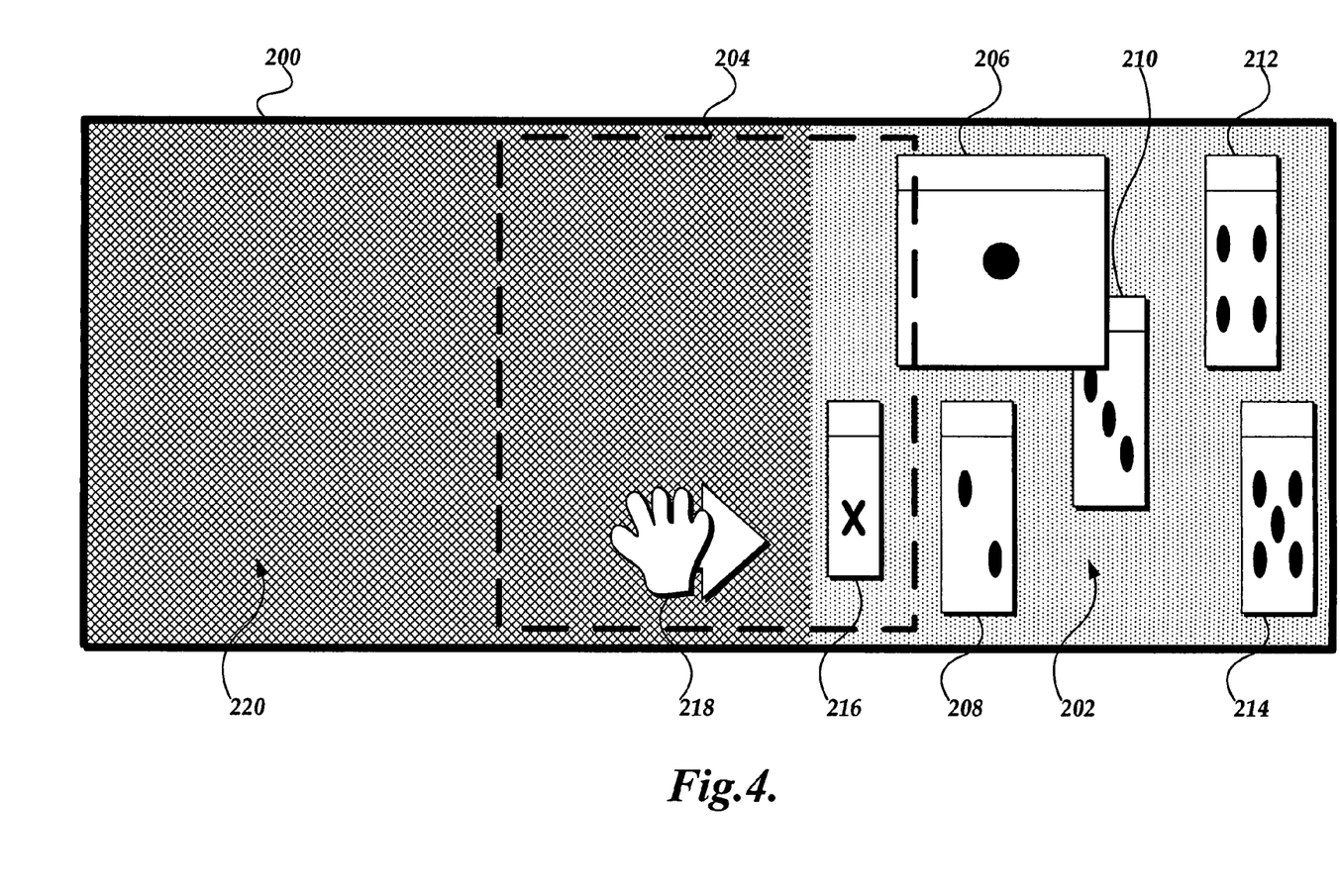
FIG. 4 is a pictorial diagram illustrating the display system and sample display content of FIGS. 2 and 3 after having been further scrolled/relocated in accordance with the present invention.

As indicated above, according to aspects of the present invention, the displayable content 202 may be repositioned such that any portion of the displayable content may be located at any position within the preferred interaction area. In this regard, FIG. 4 illustrates that the displayable content 202 is further repositioned towards the right of the display system 200 such that only icon 216 remains fully within the preferred interaction area 204. Correspondingly, that portion of the displayable content that falls entirely outside of the preferred interaction area 204 is scaled according to the available display area.

According to one embodiment of the present invention, when an object, such as icon 206 reside partially within the preferred interaction area 204, the entire icon is displayed in an unscaled manner. As shown in FIG. 4, the displayable content 202 is repositioned such that icon 206 is only partially within the preferred interaction area 204. However, as can be seen, because icon 206 is located, at least partially, within the preferred interaction area 204, the entire icon 206 is displayed in an unscaled manner. In an alternative embodiment, objects, such as icons, displayed partially within the preferred interaction area 204 are partially scaled, i.e., those portions falling outside of the preferred interaction area are scaled according to the available display area.

As can be seen, according to aspects of the present invention, displayable content 202 that falls within the preferred interaction area 204 is displayed at its normal scale.

Figure 5:
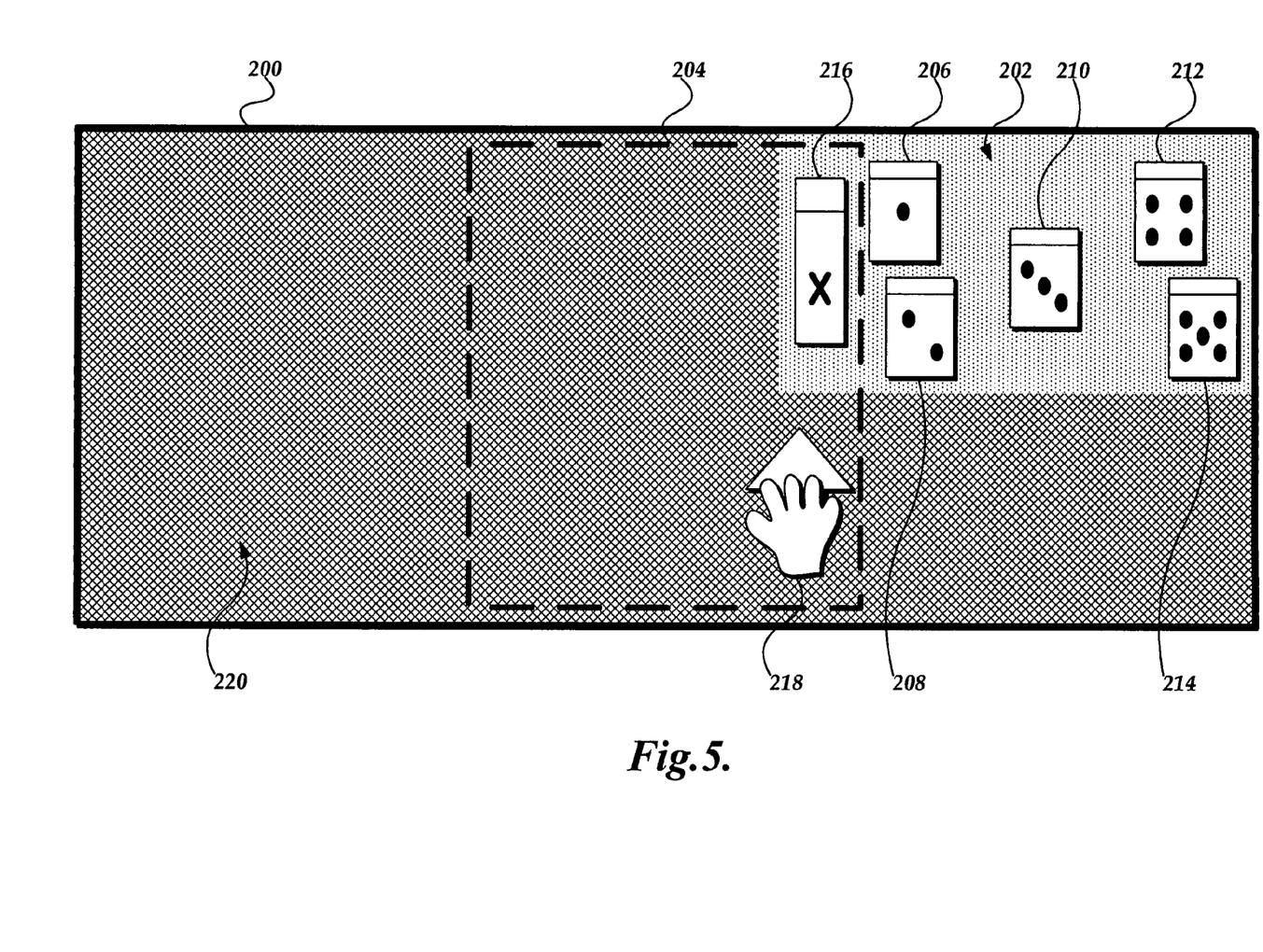
FIG. 5 is a pictorial diagram illustrating the display system and sample display content of FIGS. 2, 3, and 4 after the sample display content has been scrolled/relocated toward the top of the display system in accordance with the present invention.

While FIGS. 2-4 illustrate horizontal movements, the user is no so constrained: the displayable content can be repositioned in any direction so long as a portion of the displayable content 202 remains within the preferred interaction area. As shown in FIG. 5, a user may reposition the displayable content 202 towards the top of the preferred interaction area 204. Correspondingly, that portion of the displayable content 202 falling outside of the preferred interaction area 204 is scaled both horizontally as well as vertically.

Figure 6:
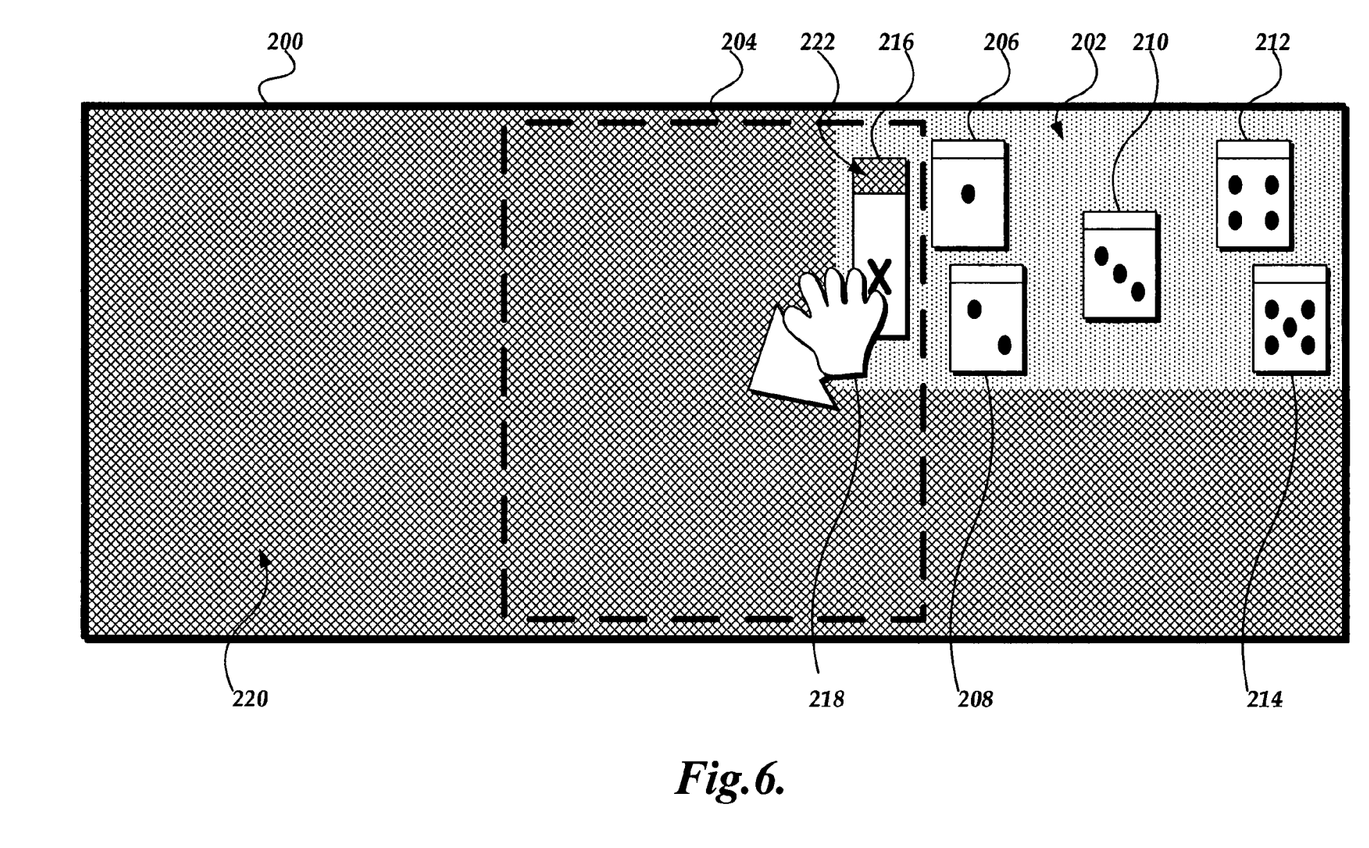
FIG. 6 is a pictorial diagram illustrating the display system and sample display content of FIG. 5 for moving objects in the displayable content.
Figure 7:
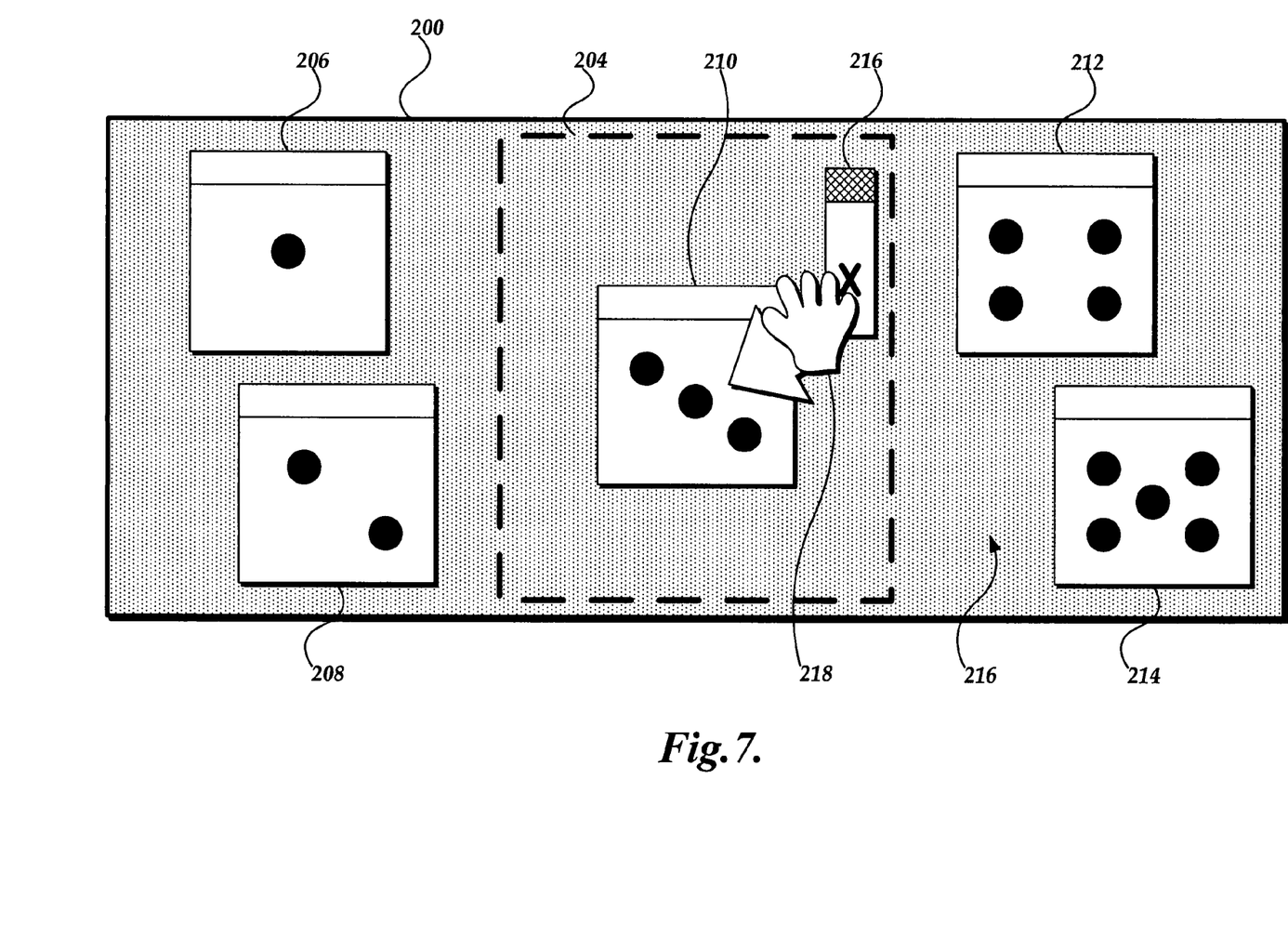
FIG. 7 is a pictorial diagram illustrating the display system and sample display content of FIG. 6 after the sample display content has been scrolled/relocated while "holding" a selected object during the relocation process.

According to further aspects of the present invention, a user may take advantage of the repositioning abilities of the present invention to relocate objects within the displayable content. FIGS. 6 and 7 are pictorial diagrams illustrating the display system 200 and displayable content 202 of FIG. 5 for relocating an object within the displayable content. As shown in FIG. 6, a user selects an object, such as icon 216, for relocation, and causes the displayable content 202 to begin to reposition/scroll. Invocation the repositioning of the displayable content 202 may be made in any number of ways, including combinations of function keys and mouse button presses, and the like. As previously shown, a repositioning icon 218 may be used to illustrate the user's desired direction with respect to repositioning the displayable content 202.

Selecting, or "holding," an object, such as icon 216, for repositioning purposes creates the appearance of temporarily fixing the held object in the preferred interaction area 102 while the displayable content 202 is repositioned. According to additional aspects of the present invention, when an object is temporarily fixed or held in the preferred interaction area 102 while repositioning the displayable content 202, some visual indication may be provided to indicate the "fixed" nature of the object. As an example, in FIG. 6 the header area 222 of the "held" icon 116 is temporarily visually modified. When the object is released, the object is again displayed in a normal manner.

Typically, the held object will remain fixed with respect to the preferred interaction area 204 until the user releases the object, such as by releasing a pressed button or key. Releasing the held object will also likely correspond to ending the repositioning of the displayable content 202. FIG. 7 is a pictorial diagram illustrating the display system 200 and displayable content 202 of FIG. 6 after having released icon 216. As shown in FIG. 7, icon 216 stayed in its fixed, "held", position with respect to the preferred interaction area 204, and is now located in a different location within the displayable content 202.

Figure 8:
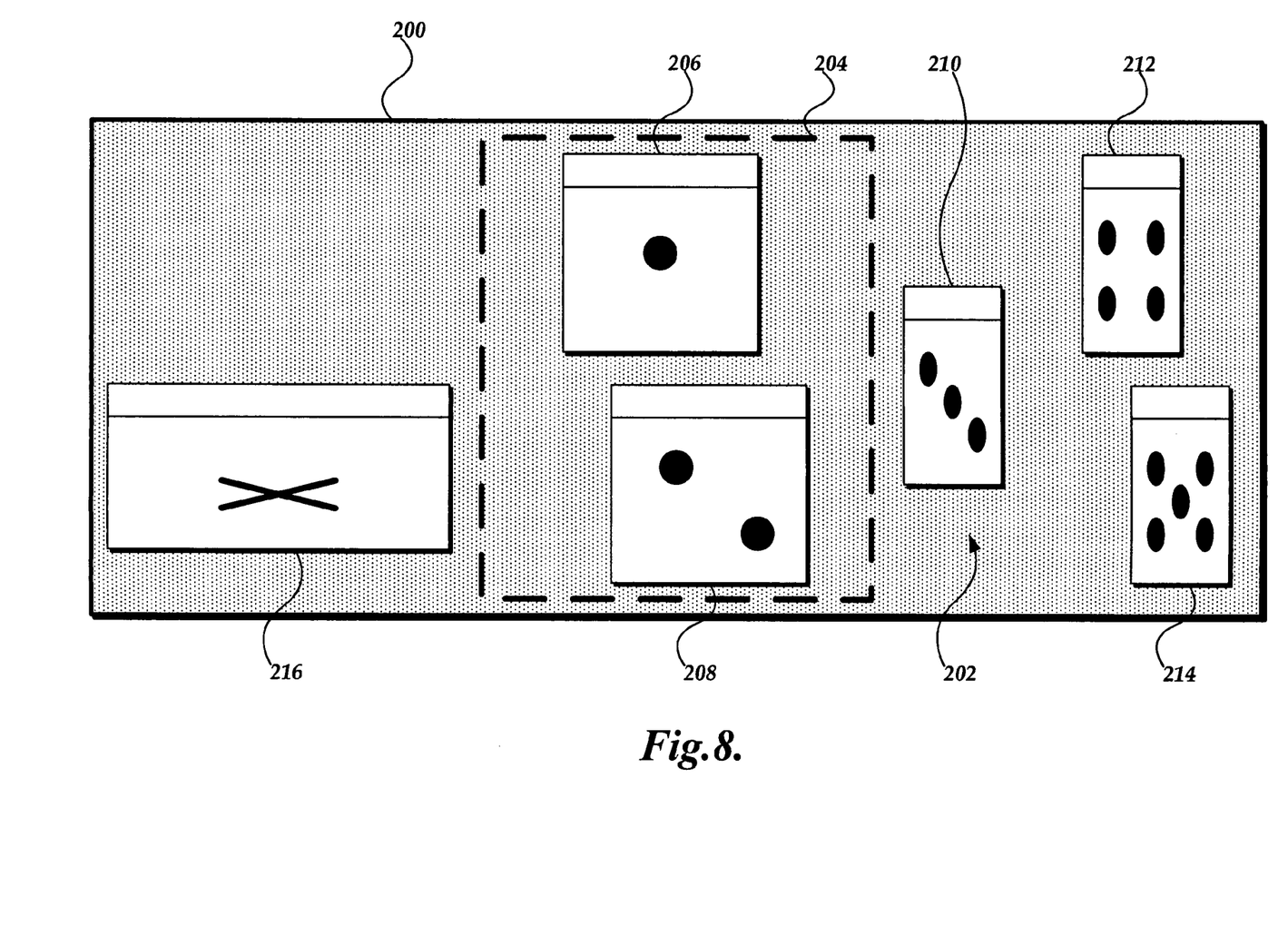
FIG. 8 is a pictorial diagram illustrating displayable content in a display system after the content has been repositioned within the display system with a portion of the content falling outside of the preferred interaction area scaled up and another portion of the content scaled down.

While the examples described above indicate that empty space may be used to backfill some areas when displayable content 202 is repositioned, there are alternatives also contemplated by the present invention. For example, according to an alternative embodiment of the present invention, when the amount of displayable content to one side of the preferred interaction area 204 will not fill the available display area on the display system 200 at its normal scale, that portion of the displayable content 202 that lies on that side of the preferred interaction area is scaled up to fill the available display area. In other words, the displayable content is scaled up from its normal size to fill the available space. Conversely, when the size of the displayable content to one side of the preferred interaction area is greater than the available display area, the display content to that side of the preferred interaction area is compressed, i.e., scaled down, to fit into the available display space. FIG. 8 is a pictorial diagram illustrating the displayable content 202 after having been repositioned within the display system 200, with a portion of the displayable content scaled up to fill the area outside of the preferred interaction area 204, and another portion of the displayable content scaled down. Still other alternatives for displaying repositioned displayable content 202 in a display system 200 are available. For example (not shown), when the size of the displayable content 202 to one side of the preferred interaction area 204 is greater than the available display area, the displayable content to that side of the preferred interaction area may be clipped or panned, i.e., displayed to the extent possible in the available display area without scaling the displayable content. Alternatively, the displayable content 202 may be conceptually fixed on a sphere, a portion of the sphere being displayed by the display system 200, and repositioning the displayable content 202 is simply a matter of rotating the sphere with respect to the preferred interaction area 204. One may alternatively conceptualize this sphere as a "wrap-around" type of repositioning, where information not displayable to one side of the preferred interaction area 204 is wrapped around the other side and used to fill in those areas vacated by the repositioning.

In addition to directly repositioning the displayable content with respect to the preferred interaction area 204, it is often quite useful to provide functionality to return the displayable content to its normal, original position, i.e., where the displayable content just fills the entirety of the display system without the necessity of scaling, backfilling, clipping, etc. For example, in one embodiment, when a user selects and moves a window on the displayable content, such as by using a click and drag operation, the displayable content repositions itself to its original position. Similarly, the user interactions may also be used to reposition the displayable content to its original position, and the present invention should not be construed as limited to any one user interaction.

Figure 9A:
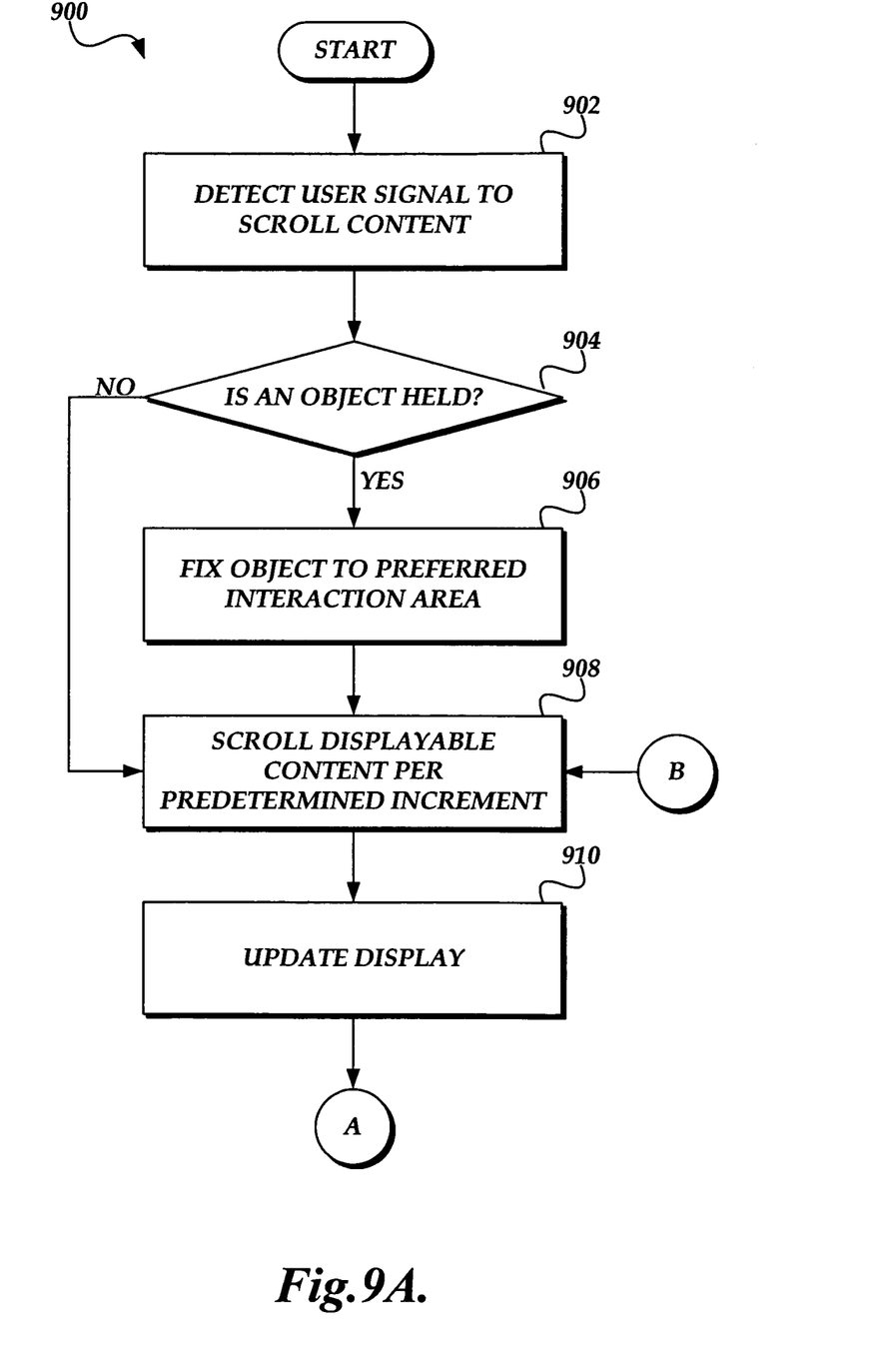
FIGS. 9A and 9B illustrate a flow diagram of an exemplary routine for repositioning and displaying displayable content on a display system according to aspects of the present invention.
Figure 9B:
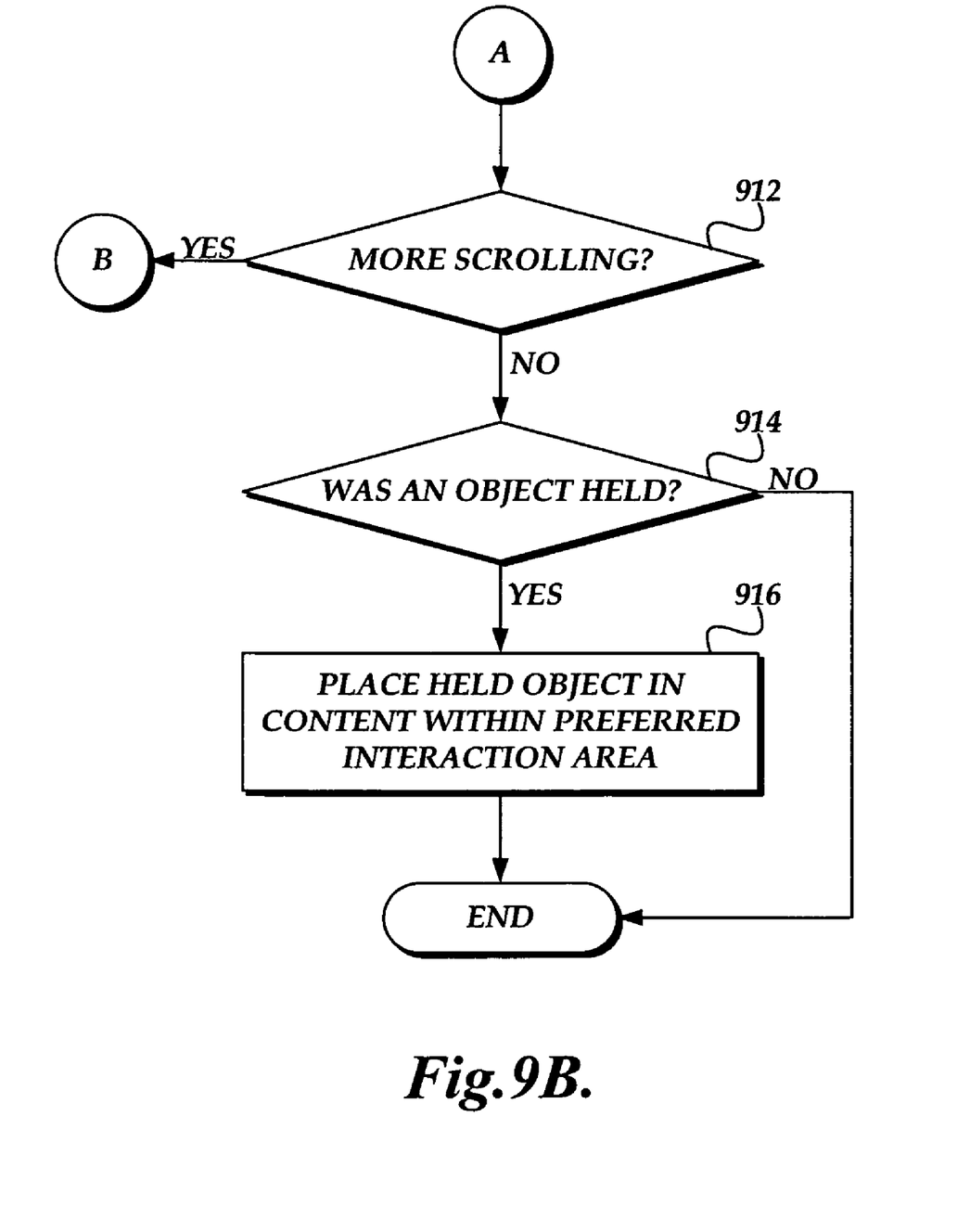

FIGS. 9A and 9B illustrate a flow diagram of an exemplary routine 900 for repositioning and displaying displayable content 202 on a display system 200 in accordance with aspects of the present invention. Beginning at block 902, a user's indication that the displayable content 202 is to be repositioned is detected. As discussed earlier, a user may indicate (or initiate) a reposition of displayable content through any number of actions.

At decision block 904, a determination is made as to whether an object displayed in the preferred interaction area is held by the repositioning action. If an object is held, at block 906, the held object is temporarily fixed at its current location in the preferred interaction area 102. Thereafter, or if an object is not held, at block 908 the displayable content 202 is repositioned according to the user's direction. As previously discussed, the content may be repositioned in an incremental or absolute fashion. If it is incremental, the displayable content is moved a determined amount. Alternatively, if the repositioning is absolute, the displayable content 202 is repositioned according to the defined, absolute position in the display system 200.

After having repositioned the displayable content 202 according to the user action that initiated the repositioning, at block 910, the displayable content is displayed on the display system 200 to reflect its new/current position.

After having updated the display of the display system 200, at decision block 912 (FIG. 9B), a determination is made as to whether to continue the scrolling process. Continuing the scrolling process is more applicable to incremental repositioning, and less so to absolute repositioning. For example, assuming the repositioning was initiated, at least in part, using a mouse button, if the mouse button remains pressed, this may be an indication that the scrolling process should continue, and the process returns to block 908 where the displayable content 202 is moved more. Alternatively, if the mouse button has been released, then in the example above, no additional scrolling should take place. Once it is determined that no additional scrolling is to be made, at decision block 914, a determination is made as to whether an object was initially held. If an object was held, at block 916, the held object is relocated in the displayable content 202 to the location immediately underneath the held object in the preferred interaction area 102. Thereafter, or if there was no held object, the routine 900 terminates.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. In a computer system having a display system displaying desktop content and having a defined preferred interaction area of the display surface on the display system in which the user interacts with the computer system, a method for relocating the desktop content on the display system, the method comprising:

detecting a reposition action indicating that the desktop content is to be repositioned with respect to the preferred interaction area;

repositioning the desktop content of the entire display surface of the display system according to the detected reposition action without repositioning the preferred interaction area, such that a portion of the desktop content previously located outside of the preferred interaction area is now located within the preferred interaction area and/or a portion of the desktop content previously located in the preferred interaction area is located outside of the preferred interaction area; and     displaying the desktop content falling outside of the preferred interaction area according to the available display area, wherein displaying the desktop content falling outside of the preferred interaction area according to the available display area comprises displaying a portion of the desktop content in a scaled manner according to the available display area outside of the preferred interaction area for that portion of the desktop content.

2. The method of claim 1, wherein any portion of the desktop content can be repositioned to any location within the preferred interaction area.

3. The method of claim 1, wherein displaying the desktop content falling outside of the preferred interaction area according to the available display area comprises displaying empty space in display areas that the desktop content no longer covers.

4. The method of claim 1, wherein displaying the desktop content falling outside of the preferred interaction area according to the available display area comprises displaying empty space in display areas that the desktop content no longer covers.

5. The method of claim 1, wherein repositioning the desktop content according to the detected reposition action comprises repositioning the desktop content in an incremental manner according to a predetermined increment.

6. The method of claim 1, wherein repositioning the desktop content according to the detected reposition action comprises repositioning the desktop content in an absolute manner, such that a predetermined portion of the desktop content is positioned to a specific location in the preferred interaction area.

7. The method of claim 1, wherein the desktop content fills the entire display area of the display system when the desktop content is unscaled.

8. The method of claim 1, wherein displaying the desktop content falling outside of the preferred interaction area according to the available display area comprises displaying the desktop content in an unscaled manner and clipping that portion of the desktop content that extends beyond the available display area.

9. The method of claim 1, wherein the preferred interaction area is selectively repositionable on the display area according to a user interaction.

10. A computer system for displaying desktop content to a user, the computer system comprising:

a user interaction means for detecting a repositioning action from a user, and for controlling the repositioning of desktop content displayed on a display system; and     a display system, the display system having a pre-defined preferred interaction area of the display surface through which a user interacts with the desktop content via the user interaction means;

wherein the computer system, upon detecting a repositioning action from a user:

repositions the desktop content of the entire display surface of the display system according to the detected repositioning action without repositioning the preferred interaction area; and         displays the desktop content falling outside of the preferred interaction area according to the available display area, wherein displaying the desktop content falling outside of the preferred interaction area according to the available display area comprises displaying a portion of the desktop content in a sealed manner according to the available display area for that portion of the desktop content.

11. The computer system of claim 10, wherein any portion of the desktop content can be repositioned to any location within the preferred interaction area.

12. The computer system of claim 10, wherein displaying the desktop content falling outside of the preferred interaction area according to the available display area comprises displaying empty space in display areas that the desktop content no longer covers.

13. The computer system of claim 10, wherein displaying the desktop content falling outside of the preferred interaction area according to the available display area comprises displaying empty space in display areas that the desktop content no longer covers.

14. The computer system of claim 10, wherein displaying the desktop content falling outside of the preferred interaction area according to the available display area comprises displaying the desktop content in an unscaled manner and clipping that portion of the desktop content that extends beyond the available display area.

15. The computer system of claim 10, wherein repositioning the desktop content according to the detected repositioning action comprises repositioning the desktop content in an incremental manner according to a predetermined increment.

16. The computer system of claim 10, wherein repositioning the desktop content according to the detected repositioning action comprises repositioning the desktop content in an absolute manner, such that a predetermined portion of the desktop content is positioned to a specific location in the preferred interaction area.

17. The computer system of claim 10, wherein the desktop content fills the entire display area of the display system when the desktop content is unscaled.

18. The computer system of claim 10, wherein the display system is comprised of a plurality of display units.

19. The computer system of claim 10, wherein the preferred interaction area can be selectively located on the display system according to user input.

20. A display system for displaying content to a user, the display system comprising:
- a pre-defined preferred interaction area, the preferred interaction area of the display surface comprising a subset of the display area of the display system, through which a user may interact with the display system to reposition the content; and
- a user interaction means through which a user repositions the content displayed on the display system;

wherein the display system, upon detecting a repositioning action from a user:
- repositions the content of the entire display system according to the detected repositioning action without repositioning the preferred interaction area, such that a portion of the content previously outside of the preferred interaction area is now located within the preferred interaction area; and displays the content falling outside of the preferred interaction area according to the available display area for displaying content outside of the preferred interaction area in a scaled manner according to the available display area for that portion of the desktop content.

* * * * *